Aug. 30, 1932.   E. E. EINFELDT   1,874,943
WHEEL CONSTRUCTION
Original Filed Oct. 31, 1929   3 Sheets-Sheet 2
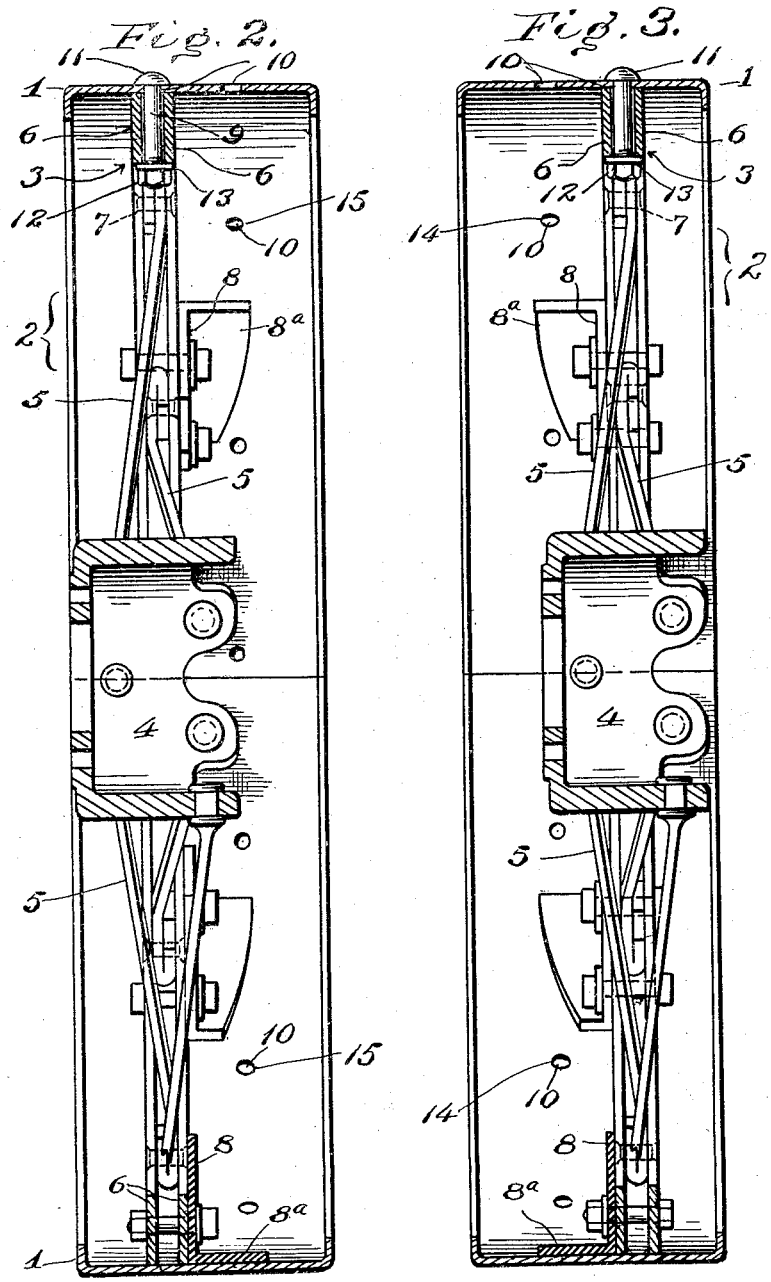
INVENTOR.
E. E. Einfeldt
BY
Morrison, Kennedy, Campbell
ATTORNEYS.

Aug. 30, 1932.  E. E. EINFELDT  1,874,943
WHEEL CONSTRUCTION
Original Filed Oct. 31, 1929  3 Sheets-Sheet 3
Fig 4.
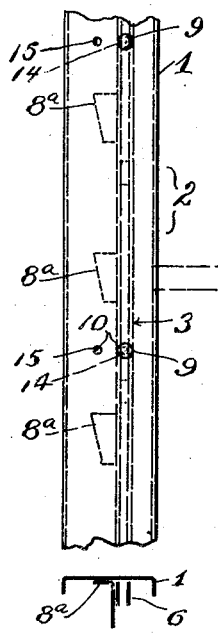 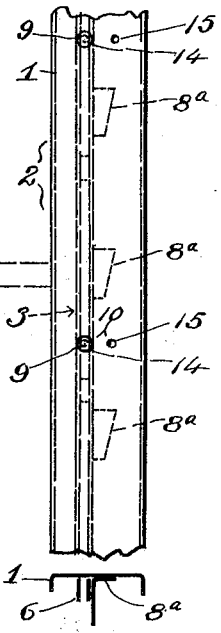
Fig. 5.
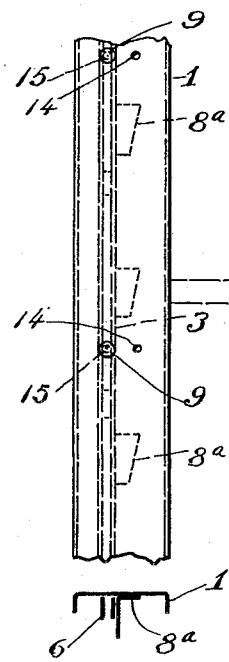 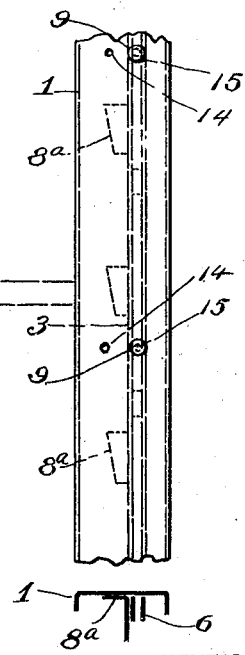
INVENTOR.
E. E. Einfeldt
BY
Morrison, Kennedy Campbell
ATTORNEYS Patented Aug. 30, 1932

1,874,943

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

WHEEL CONSTRUCTION

Original application filed October 31, 1929, Serial No. 403,735. Divided and this application filed June 26, 1930. Serial No. 463,899.

This invention relates to wheels, more particularly for use on farm and agricultural implements, tractors and similar machines, one of the objects being to provide for the use in connection with a wheel having a narrow rim or tread, or in connection with a wheel having a so-called "open" rim, which two kinds of rims are adaptable for use more particularly on comparatively firm ground, a supplemental or outer rim applicable at will to said rims to adapt the wheel to travel on soft or sandy soil. A further object of the invention is to provide in the use of said supplemental rim, means whereby to adjust the same relative to the wheel in the direction of the axis of the latter, and thereby to vary the width of the track of the vehicle equipped with such wheels, in order to meet the different requirements encountered in practice.

With these and other objects in view the invention consists in the improved form and arrangement of parts to be described in detain in the specification to follow, and in certain novel features thereof, which will be pointed out in the appended claim.

In the accompanying drawings:

Fig. 2 is a transverse section through the same on the line 2—2 of Fig. 1, and showing the supplemental or outer rim adjusted relatively to the inner rim to give a vehicle equipped with such wheels a relatively wide track;

Fig. 3 is a similar view showing the supplemental or outer rim in a different position of adjustment to give a narrower track to the vehicle;

Fig. 4 is a diagrammatic plan view showing two wheels and a connecting axle, with the supplemental rims adjusted relative to the inner rims, as shown in Fig. 2, in order to give the vehicle a relatively wide track;

Fig. 5 is a similar view showing the supplemental rim adjusted as shown in Fig. 3, to give the vehicle a narrower track;

Figure 1:
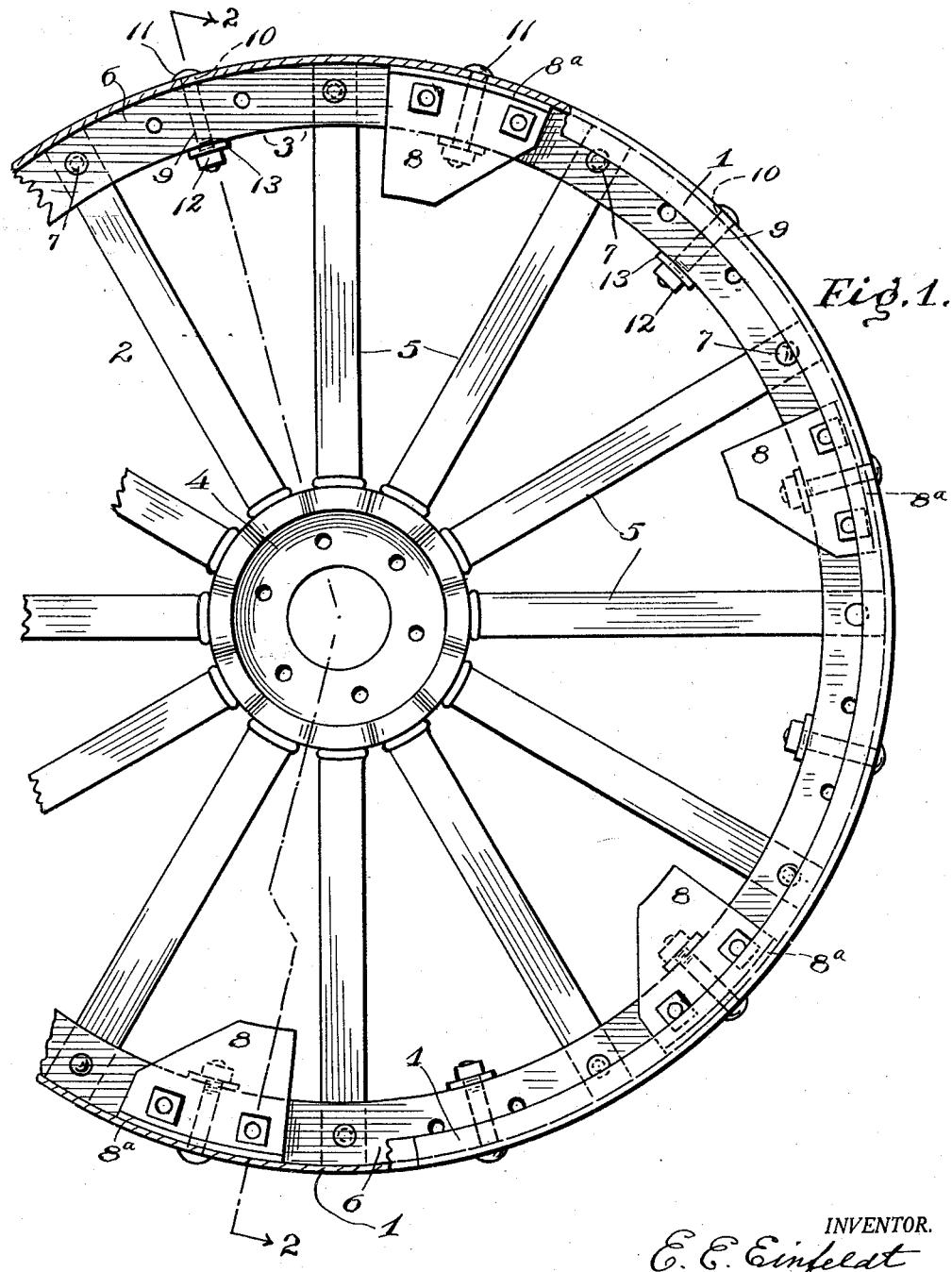
Fig. 1 is an elevation of a wheel partly in section having my invention embodied therein.

Referring to the drawings:

The improved supplemental rim 1 is illustrated as applied to a wheel 2, provided with a so-called "open" rim 3 of the specific form shown in my copending application filed October 31st., 1929, Serial No. 403,735, of which the present application is a division, and to which original application reference may be had for a more detailed description of said open rim than is here given, since the present invention is concerned with the detailed form and manner of application of the supplemental rim, per se, which is applicable to other forms of rims than that herein specifically illustrated.

On reference to Figs. 1 and 2, it will be seen that the wheel therein shown consists of a hub 4, spokes 5 of flat form, and the rim 3, made up of two annular plates 6 spaced apart by the outer folded ends of the spokes, which folded ends are seated between said plates and are fastened firmly thereto by rivets 7 extending through the plates and the folded ends of the spokes between them. This form and arrangement of the parts produces a wheel with a narrow rim of the so-called "open" type, and is adapted for use on moderately firm ground, and not so soft that the narrow rim will sink unduly therein.

As disclosed in said application, there are employed in connection with a rim of this specific form, traction cleats each in the form of a flat base plate 8 of general triangular form having at one end a curved flange 8ª. said base plate being provided with a number of bolt holes which adapt the cleat to be fastened to the rim in different positions to secure different tractive effects, one position, with the curved flange extending radially and beyond the perimeter of the rim so as to act with the maximum tractive effect, and another position, with the curved flange extending circumferentially or flush with the perimeter of the rim, to act with a modified tractive effect, and give the rim a more extended tread surface.

In Figs. 1, 2 and 3, these cleats are shown in the last mentioned adjusted relation to the rim 3, and in this position they lend themselves very effectively to the application to said rim of my improved outer or supplemental rim 1, which is shown as being of considerably greater width than the inner rim 3, and as encircling said inner rim and supported at intervals by the flush curved flanges of the cleats. This rim 1 may be formed in any desired manner, either of a single piece of material, or of a number of sections secured together in any suitable manner, according to whether the rim is flangeless or is provided with edge flanges as shown. Conveniently, it may be made up of two semi-circular flanged sections, as shown in Figs. 2 and 3 and these sections bolted to the rim of the inner wheel.

The outer rim 1 is adapted to be detachably fastened to the inner rim 3 in any suitable manner which will admit of its application or removal at will. In the present instance it is secured by means of a plurality of fastening elements in the form of bolts 9, the shanks of which extend radially between the annular plates 6 of the inner rim 3 and through holes 10 in the outer rim, and are provided at their outer ends with heads 11 bearing against the outer side of the outer rim. At their inner ends, said shanks are provided with clamping nuts 12 which bear against suitable washers or anchor plates 13 seated against the inner edges of the two annular rim plates 6.

This outer rim is adapted to be fastened to the inner rim in different positions axially of the wheel, in order to give the vehicle or machine whose wheels are equipped with such rims, different widths of track. To effect this object, the outer or supplemental rim is provided with two series 14 and 15 of the holes 10, the holes of which series are spaced at suitable intervals around the rim, but which series are spaced from each other in an axial direction, as shown in Figs. 1 and 2.

In Fig. 2, the outer rim is shown as adjusted on the inner rim so that the outer edge of the outer rim will be disposed at a greater distance from the plane of the wheel than its inner edge, the series 14 of the bolt holes being used for this adjustment. This adjustment is employed when the vehicle is to have a comparatively wide track. In Fig. 3, the rim is shown as adjusted axially so that its inner edge will be disposed at a greater distance from the plane of the wheel than its outer edge, the other series of bolt holes 15 being used for this adjustment in order to give the vehicle a narrower track.

These effects are best illustrated in Figs. 4 and 5, Fig. 4 showing the supplemental rims adjusted on the inner rims of the two wheels to the position shown in Fig. 2 to give the vehicle a relatively wide track, while Fig. 5 shows the outer rims adjusted on the inner rims inwardly to the position shown in Fig. 3, in order to give the vehicle a narrower track. It is evident therefore that by shifting the outer rim axially with reference to the inner rim, as provided for by the different adjustments described, the track of the vehicle may be readily varied to meet the conditions and requirements encountered in practice.

By the use of the invention above described, a narrow wheel rim, or an "open" type of wheel rim, may be readily converted into a wide, or into a "closed" type of rim; and by the use of my improved supplemental outer rim adjustable axially of the inner rim, the track of a vehicle may be changed as desired and to meet the requirements of practice.

The improved outer rim has been shown and described as applied to an inner rim of a specific form as disclosed in my said original copending application, since a rim of the specific form shown in said application lends itself very effectively to the application of the supplemental rim. It will be manifest however to the skilled mechanic that the invention is not limited to use in connection with an inner rim of the particular form disclosed, but is applicable to other forms of wheels and inner rims, and wherever the conditions are such as to require the use of a supplemental or outer rim of my improved type. The invention is therefore not limited to any particular form or construction of the parts, except in so far as such limitations are specified in the claim.

Having thus described my invention, what I claim is:—

In combination with a wheel provided with a pair of spaced annular rim members, a series of traction cleats applied to the outer side of one of said rim members, said cleats being each characterized by a laterally extending flange curved circumferentially to conform to and extend substantially flush with the periphery of said rim members, an outer rim surrounding said rim members and bearing on said curved flanges of the cleats, and fastening bolts for detachably securing said outer rim to the annular rim members, the shanks of said fastening bolts extending between the annular rim members.

In testimony whereof, this specification has been duly signed by:
ERNEST E. EINFELDT.